United States Patent
Salomone

(10) Patent No.: US 8,452,281 B2
(45) Date of Patent: ***May 28, 2013

(54) ADJUSTMENT OF BACKGROUND SCANNING INTERVAL BASED ON NETWORK USAGE

(75) Inventor: Leonardo José Silva Salomone, Nepean (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,944

(22) Filed: Jun. 25, 2012

(65) Prior Publication Data

US 2012/0263070 A1   Oct. 18, 2012

Related U.S. Application Data

(63) Continuation of application No. 12/826,187, filed on Jun. 29, 2010, now Pat. No. 8,229,425, which is a continuation of application No. 11/383,233, filed on May 15, 2006, now Pat. No. 7,792,526.

(51) Int. Cl.
*H04W 4/00* (2009.01)
*H04W 48/16* (2009.01)

(52) U.S. Cl.
CPC .................... *H04W 48/16* (2013.01)
USPC ........... 455/434; 455/436; 455/450; 455/455; 455/464; 455/422.1; 370/318; 370/328; 370/311

(58) Field of Classification Search
CPC .............................. H04W 18/16; H04Q 11/04
USPC .............. 455/434, 436, 450, 455, 464, 422.1; 370/318, 328, 311
See application file for complete search history.

(56) References Cited

U.S. PATENT DOCUMENTS

| 6,185,423 | B1 * | 2/2001 | Brown et al. | 455/434 |
| 6,360,097 | B1 | 3/2002 | Smith et al. | |
| 7,756,082 | B1 * | 7/2010 | Dhamdhere | 370/331 |
| 7,792,526 | B2 * | 9/2010 | Salomone | 455/434 |
| 8,229,425 | B2 * | 7/2012 | Salomone | 455/434 |
| 2004/0090929 | A1 | 5/2004 | Laux et al. | |
| 2004/0120278 | A1 | 6/2004 | Krantz et al. | |
| 2004/0137908 | A1 * | 7/2004 | Sinivaara et al. | 455/452.1 |

(Continued)

OTHER PUBLICATIONS

Li, Mei, First Office Action for CA 2,581,620, Dec. 9, 2010.

(Continued)

*Primary Examiner* — Charles Appiah
*Assistant Examiner* — Khai M Nguyen
(74) *Attorney, Agent, or Firm* — Integral Intellectual Property Inc.; Miriam Paton

(57) ABSTRACT

In a Wireless Local Area Network (WLAN), roaming from one access point to another by a mobile station without interruption to network service may be facilitated by frequently performing background scans to find neighboring access points while the mobile station is associated to the WLAN. Frequent background scanning, however, depletes battery life. By dynamically adjusting the background scanning interval during the mobile station's association to the WLAN, the mobile station's immediate need for network connectivity performance may be met, while simultaneously prolonging battery life. For example, by using a shorter background scanning interval during a telephone conversation, network connectivity performance may be maintained throughout the call. Longer background scanning intervals may be used during periods when interruptions to network connectivity may be better tolerated.

21 Claims, 3 Drawing Sheets

U.S. PATENT DOCUMENTS

2004/0205158 A1 10/2004 Hsu
2005/0048972 A1 3/2005 Dorenbosch et al.
2007/0004405 A1 1/2007 Buckley et al.
2010/0080134 A1 4/2010 Maniatopoulos et al.

OTHER PUBLICATIONS

Li, Mei, Second Office Action for CA 2,581,620, Nov. 30, 2011.

Rosenauer, Hubert, First Exam Report for EP 06113953.1, Dec. 14, 2007.

Rosenauer, Hubert, Second Exam Report for EP 06113953.1, Sep. 17, 2008.

Rosenauer, Hubert, Extended European Search Report for EP 06113953.1, Oct. 23, 2006.

Mei Li, Third Office Action for CA 2,581,620, dated Jan. 16, 2013.

* cited by examiner

ADJUSTMENT OF BACKGROUND SCANNING INTERVAL BASED ON NETWORK USAGE

CROSS-REFERENCE TO RELATED APPLICATIONS

This application is a continuation of U.S. patent application Ser. No. 12/826,187, filed Jun. 29, 2010, which itself is a continuation of U.S. patent application Ser. No. 11/383,233 filed May 15, 2006, now U.S. Pat. No. 7,792,526, issued Sep. 7, 2010, both of which are incorporated by reference in their entirety.

BACKGROUND

In a Wireless Local Area Network (WLAN) comprising a number of access points (APs), mobile stations (STAs) roam from one AP to another as they change locations with their users. There are two ways for a mobile station to discover available access points to roam to. Either it can search periodically for alternatives, so that it has a list ready when it is ready to roam, or it can wait until it is necessary to roam to search for other access points. In the first approach, called pre-emptive discovery, a station periodically scans the WLAN channels to learn about its neighboring access points, in a process usually referred to as background scanning. This process may be either active, where the station sends probes out on all its channels to detect neighboring access points, or passive, where the station listens on all its channels for access point beacons. The frequency of background scans directly impacts the roaming performance of a WLAN device. If background scans are not performed frequently enough, the device may fail to pick the optimal access point while roaming, or even fail to find a neighbor and disconnect.

Decreasing the background scanning interval improves network connectivity performance; however, it also degrades battery life, because scanning is a process that consumes a significant amount of power. In selecting a scanning interval, a compromise is made between preserving battery power, and providing adequate roaming capabilities.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
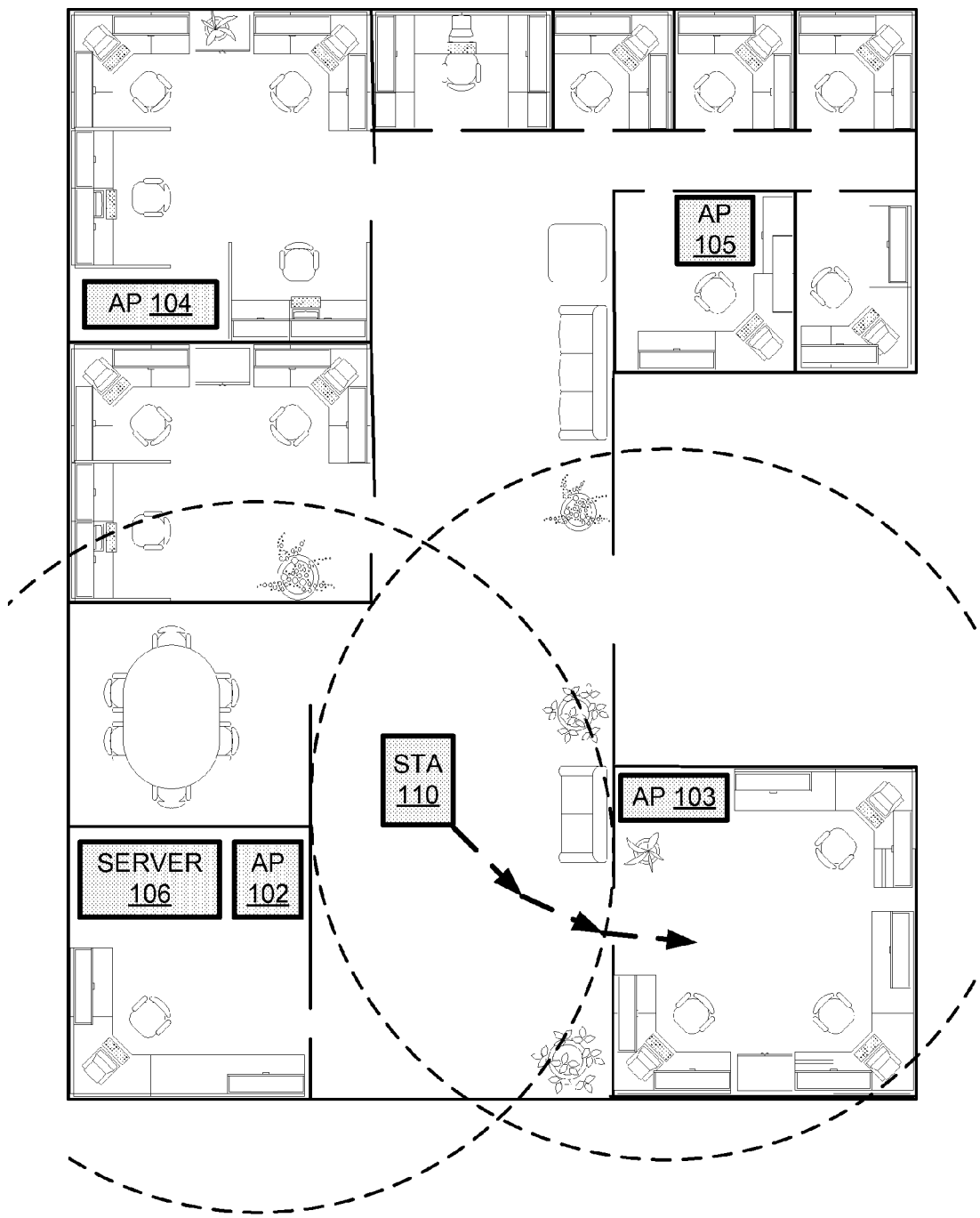
FIG. 1 is an illustration of an exemplary deployment of a wireless local area network (WLAN) in a building, according to an embodiment of the invention. The WLAN includes access points (APs) and a switched, routed fabric including a server.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

While decreasing the background scanning interval improves seamless roaming capabilities, it degrades battery life, since scanning is a process that consumes a significant amount of power. It is necessary, therefore, to trade off network connectivity performance against battery conservation. Typically, the background scanning interval for a STA is set to a constant value by the device manufacturer. However, using a single background scanning interval that stays constant over time may not be ideal. The need for network connectivity performance is not constant over time, but rather, varies with how the STA is being used with respect to its network connection.

A mobile station that may be used with a WLAN may support various types of network-related activity. For example, the mobile station may be equipped for any of the following activities or any combination thereof: Internet browsing, sending and receiving e-mail, conducting VoIP conversations, and the like. These activities have different needs for network connectivity. A VoIP application, for example, has a significant need for uninterrupted network connectivity during an active call.

Different network usage modes may be defined for a STA according to the activities' needs for uninterrupted WLAN access and bandwidth. The usage modes may be defined based on: (A) which applications are currently active (i.e., which applications are actively consuming CPU time, or are in the foreground of the STA's screen), (B) how the applications are being used with respect to network connectivity, or (C) through direct monitoring of the STA's network traffic.

A non-exhaustive list, Set A, of exemplary network usage modes based on applications includes:

Disconnected: STA is not connected to the WLAN;

Connected Idle: STA is connected to the WLAN, but the only network activity of the STA is that which is required to maintain a connection to the WLAN;

Connected with User Interface Activity: STA is connected to the WLAN and an application or applications that do not require a network connection are active, e.g., calculator, task list, calendar, address book etc.;

Connected Email: STA is connected to the WLAN, and an email application in the STA is active (e.g. the user is actively typing, reading, sending, and/or receiving email);

Connected Instant Messaging: STA is connected to the WLAN and an instant messaging application in the STA is active (e.g., the user is actively typing, reading, sending and/or receiving instant messages);

Connected Browsing: STA is connected to the WLAN and a network browsing application in the STA is active;

Connected Media Streaming: STA is connected to the WLAN and a media streaming application in the STA is active;

Connected in a Phonecall: STA is connected to the WLAN and a telephone application in the STA is active and a call is established via the network (e.g. a VoIP call).

This list of usage modes is in order of increasing network connectivity performance requirements, i.e., the network connectivity performance requirements of a phone call are higher than for instant messaging or email activities. For activities which have higher requirements for network usage, roaming performance is considered more critical, and a shorter background scanning interval is preferred. In the "Connected in a Phone Call" mode, roaming performance is preferred over power consumption, so the background scanning interval may be reduced. In the "Connected Idle" mode, the power consumption becomes more important than the roaming performance, and the background scanning interval may be increased. In the "Disconnected" mode, background scanning is turned off (i.e. the background scanning interval is infinite). For intermediate network usage modes, such as email or instant messaging applications, roaming performance and power conservation may have similar weight, and the background scan interval may be set at a median level. Other network usage modes may be defined and included in such a list where appropriate according to their anticipated network connectivity performance requirements.

A non-exhaustive list, Set B, of example network usage modes based on how the applications are being used with respect to network connectivity includes:

Disconnected: STA is not connected to the WLAN;

Connected Idle: STA is connected to the WLAN, but the only network activity of the STA is that which is required to maintain a connection to the WLAN. There is either no user interface activity, or there is user interface activity that is not likely to result in the need to transmit or receive data to/from the network, e.g. calculator, task list, calendar;

Connected with User Interface Activity: STA is connected to the WLAN and there is user interface activity that is likely to result in network activity, e.g., looking up a contact in an address book, composing an email. No network transmission or reception is taking place;

Connected Email: STA is connected to the WLAN, and email is being sent and/or received via the WLAN;

Connected Instant Messaging: STA is connected to the WLAN and the user is actively typing, reading, sending and/or receiving instant messages, so that instant messages and/or notifications about instant message activities and statuses are being sent and/or received via the WLAN;

Connected Browsing: STA is connected to the WLAN and a network browsing application in the STA is active;

Connected Media Streaming: STA is connected to the WLAN, a media streaming application in the STA is active and an audio and/or video streaming session (e.g. podcast) is in progress;

Connected in a Phonecall: STA is connected to the WLAN and a telephone application in the STA is active and a call is established via the network (e.g. a VoIP call).

This list of usage modes is also in order of increasing network connectivity performance requirements. Usage modes having higher network connectivity performance requirements may be associated with shorter background scanning intervals. Other network usage modes may be defined and included in such a list where appropriate according to their anticipated network connectivity performance requirements.

In this method, each application may periodically or occasionally send information about the user's activities to a centralized network usage application. The network usage application may then determine which of the usage modes is appropriate, and may determine a minimal background scanning interval from the usage mode.

It may also be possible to determine the requirements for network connectivity performance of the STA by monitoring the actual network traffic characteristics and deducing the current applications status. A non-exhaustive list, Set C, of exemplary network usage modes based on network traffic includes:

Disconnected: STA is not connected to the WLAN;

Connected Idle: STA is connected to the WLAN, with sporadic, intermittent network activity (for example, usually 3 frames or less per IEEE 802.11 beacon);

Connected Email: STA is connected to the WLAN, with medium-sized packets (e.g., packets between 200-600 bytes in length), sent within a pre-defined packet rate (e.g., 10 at least 10 packets in 20 seconds);

Connected Instant Messaging: STA is connected to the WLAN, with small (e.g., less than 200 bytes in length) intermittent packets from/to the same destination with inter-packet spacing of approximately one to five seconds;

Connected Browsing: STA is connected to the WLAN, and medium to large (e.g., 600-1500 bytes in length) packets are being continuously transmitted and received for longer than a few seconds;

Connected Phonecall and/or Media Streaming: STA is connected to the WLAN, and there are periodic incoming and/or outgoing medium-size high-priority packets with inter-packet spacing of less than 100 ms.

In addition, it is possible to combine, either wholly or partially, sets A to C in order to determine the network connectivity requirements of the STA. For example, using set A, a STA may have an email application that is currently in the foreground, resulting in the selection of the "Connected e-mail" mode, whereas using set C, monitoring the traffic directly determines that the STA's mode is "Connected Idle". To select the most appropriate background scanning interval, a rule may be defined such that the mode that corresponds to the shorter background scanning interval will be selected.

To better balance the requirements of roaming performance and battery conservation, the background scanning interval may be changed dynamically according to the current network usage mode of the STA. This may be done automatically, without any need for user intervention. The STA itself may monitor the user's activities and adjust the background scanning interval according to the current WLAN requirements. In one example, network usage modes such as defined above may be used to characterize the STA's current network needs, and the background scanning interval may be adjusted on the basis of the current network usage mode. The background scanning may be active or passive or any combination thereof.

FIG. 1 is an illustration of an exemplary deployment of a wireless local area network (WLAN) in a building, according to an embodiment of the invention. The WLAN includes APs 102, 103, 104 and 105 in a switched, routed fabric including a server 106.

A mobile station 110 may be active in the WLAN. A non-exhaustive list of examples for mobile station 110 includes a wireless-enabled laptop, a wireless-enabled cellphone, a wireless-enabled PDA, a wireless-enabled smartphone, a wireless-enabled video camera, a wireless-enabled gaming console, a wireless Voice over Internet Protocol (VoIP) phone and any other suitable wireless-enabled mobile station.

In the example of FIG. 1, APs 102, 103, 104 and 105, server 106 and mobile station 110 are compatible with a wireless networking standard, such as the Institute of Electrical and Electronic Engineers (IEEE) 802.11 standard for Wireless LAN Medium Access Control (MAC) and Physical layer (PHY) specifications. However, it will be obvious to those of ordinary skill in the art how to modify the following for other existing WLAN standards or future related standards.

Mobile station 110 may roam, for example, from the coverage area of AP 102, to the coverage area of AP 103 during a single conversation. To maintain the quality of the conversation, the roaming must happen seamlessly and must be transparent to the user of the station. During a conversation, then, a shorter background scanning interval is desirable in order to maintain at all times a current list of available APs. On other occasions, when mobile station 110 is not currently in use for a conversation or another activity requiring continuous data streaming, a short interruption to service may not be noticeable to the user. During these times, a longer background scanning interval may be used to conserve battery power.

Figure 2:
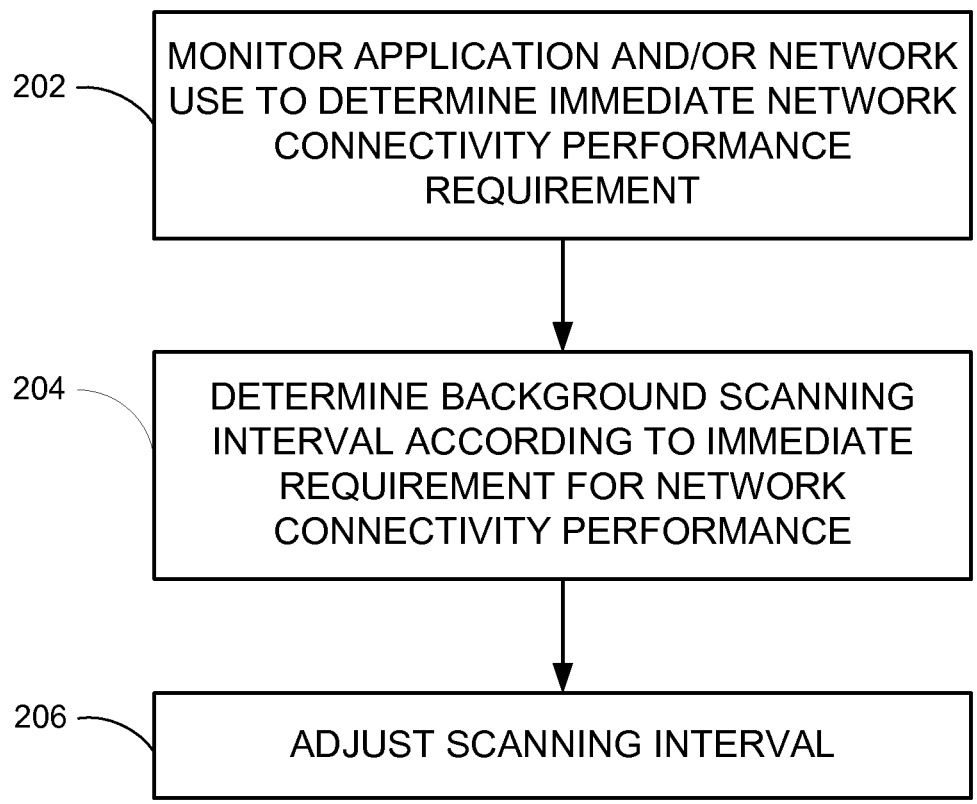
FIG. 2 is a flowchart of an exemplary method implemented by a mobile station to conserve battery power while roaming, according to an embodiment of the invention.

FIG. 2 is a flowchart of a method implemented by a mobile station 110, according to an embodiment of the invention. At 202, mobile station 110 monitors its own network usage. This may be accomplished either at the STA application level by monitoring the user's activities, or at a lower level by directly monitoring the STA's own network traffic, or by some combination of these approaches. For example, separate applications that are being run on the STA, including for example, an email application, and/or a VoIP application, may send alerts about the user's activities to a network usage application. A network usage application may classify the current state of the STA according to a list of network usage modes, by monitoring which applications are active, or by using the alert messages from the other applications. Alternatively or additionally, the station may deduce directly from the characteristics of the network traffic which of the list of network usage modes reflects its current state. For example, medium to large sized packets back-to-back are characteristic of a browsing session, medium-sized, high-priority packets at a constant rate are characteristic of a telephone VoIP call, and e-mail may have similar characteristics to browsing, but with less data and in shorter periods of time. The station may then determine its immediate requirement for network connectivity performance from the usage mode.

The usage mode represents the station's immediate requirement for network connectivity performance. At 204, a background scanning interval is determined on the basis of the station's immediate requirement for network connectivity performance. At 206, the background scanning interval may be adjusted at the WLAN control level to the interval determined at 204.

Computer-executable instructions for implementing a power management scheme such as the above-described method in a mobile station may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by internet or other computer network forms of access.

Figure 3:
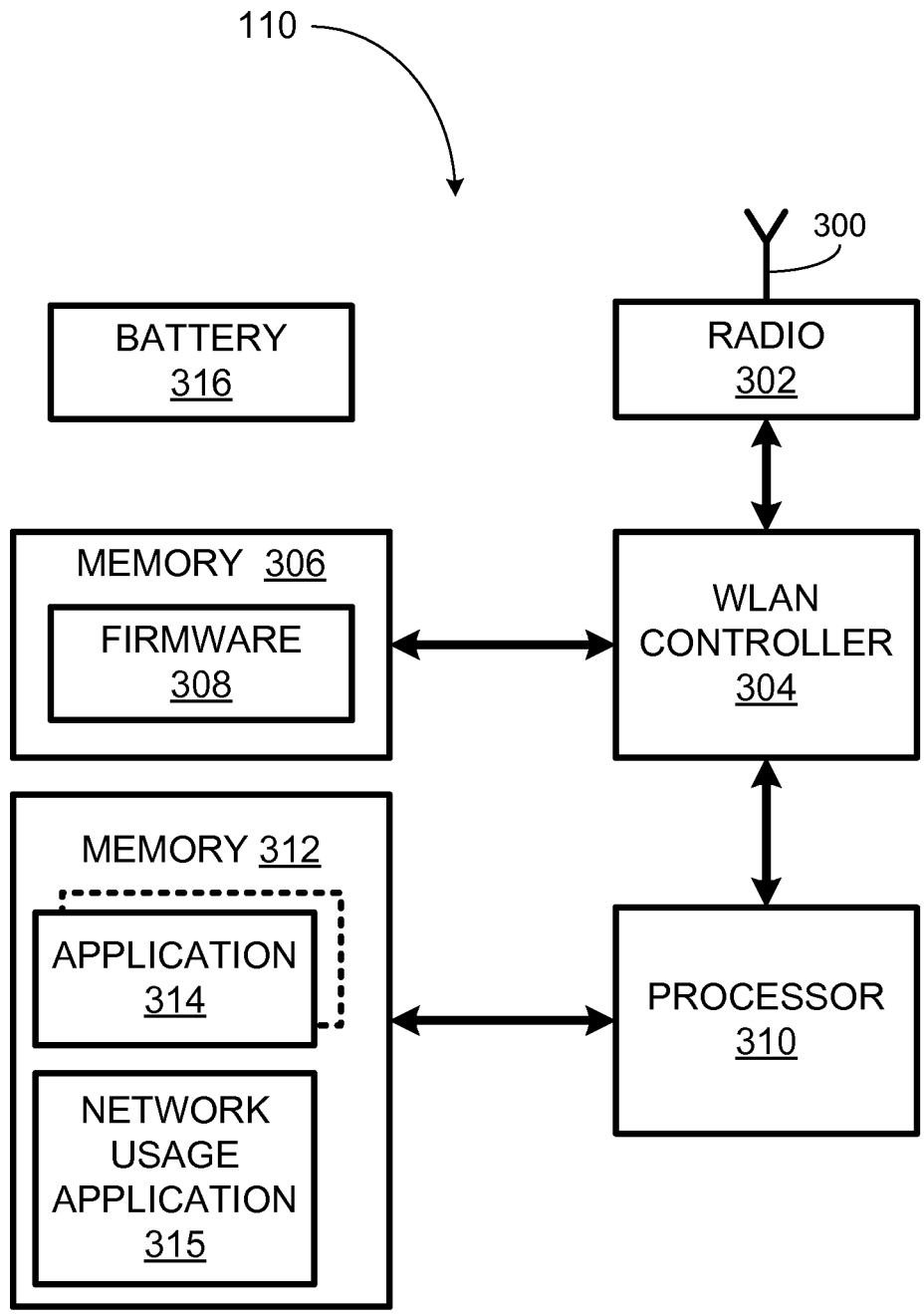
FIG. 3 is a block diagram of an exemplary mobile station compatible with the method shown in FIG. 2.

FIG. 3 is a block diagram of an exemplary mobile station, according to some embodiments of the invention. Mobile station 110 includes at least one antenna 300 coupled to a radio 302, which in turn is coupled to a WLAN controller 304. WLAN controller 304 may be coupled to a memory 306 storing firmware 308 to be executed by WLAN controller 304. Mobile station 110 includes a processor 310 and a memory 312 coupled to processor 310. Memory 312 may store executable application code modules 314 to be executed by processor 310. Application code modules 314, when executed by processor 310, may perform network functions such as internet browsing, email, or telephony applications. Memory 312 may store a network usage application code module 315, which when executed by processor 310, may use information about the user's activities to determine the immediate networking connectivity performance requirements, and determine an appropriate background scanning interval. Alternatively, or in addition, network usage application code module 315 may inspect the network traffic of mobile station 110 in order to deduce its immediate networking connectivity performance requirements. Alternatively, WLAN controller 304 may itself inspect the network traffic of mobile station 110 in order to deduce the immediate network connectivity performance requirements of mobile station 110 and to adjust the background scanning interval accordingly. If the method of direct monitoring of network traffic is used exclusively, network usage application 315 would be unnecessary, as the WLAN controller has the ability to monitor traffic directly, and to control the background scanning interval itself.

Processor 310 may be coupled to WLAN controller 304 and may be able to control, at least in part, the operation of WLAN controller 304. Mobile station 110 includes a battery 316 to provide power to radio 302, WLAN controller 304, processor 310 and memories 306 and 312. Mobile station 110 may include other components that, for clarity, are not shown.

Radio 302, WLAN controller 304, processor 310 and memories 306 and 312 are functional blocks and may be implemented in any physical way in mobile station 110. For example, radio 302, WLAN controller 304, processor 310 and memories 306 and 312 may be implemented in separate integrated circuits, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

A non-exhaustive list of examples for processor 310 includes a central processing unit (CPU), a digital signal processor (DSP), a reduced instruction set computer (RISC), a complex instruction set computer (CISC) and the like.

Memories 306 and 312 may be fixed in or removable from mobile station 110. A non-exhaustive list of examples for memories 306 and 312 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 300 includes a dipole antenna, a monopole antenna, a multilayer ceramic antenna, a planar inverted-F antenna, a loop antenna, a shot antenna, a dual antenna, an omnidirectional antenna and any other suitable antenna.

Application code modules 314, when executed by processor 310, may monitor current user activities. The network applications may send information about the user's activities to another application that determines an appropriate background scanning interval, or may themselves determine a background scanning interval. Assigning a usage status mode such as described above may be performed as an intermediate step to determining a background scanning interval. The background scanning interval is then updated at WLAN controller 304, which controls the background scanning performed by radio 302.

Alternatively, mobile station 110 may periodically monitor its own network traffic in order to determine its current network access needs and an appropriate background scanning interval.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for power management in a mobile station in a wireless local area network, the method comprising:
   at a point in time:
   determining according to a first consideration a first current wireless network usage mode for the mobile station, the first current wireless network usage mode corresponding to a first background scanning interval for the mobile station;
   determining according to a second consideration a second current wireless network usage mode for the mobile station, the second current wireless network usage mode corresponding to a second background scanning interval for the mobile station that differs from the first background scanning interval;
   selecting whichever of the first background scanning interval and the second background scanning interval is shorter; and
   ensuring that following the point in time, any background scanning to check for neighboring access points is performed periodically at the selected background scanning interval until a different background scanning interval has been determined and selected.

2. The method as recited in claim 1, wherein determining the first current wireless network usage mode according to the first consideration comprises monitoring the mobile station's network traffic.

3. The method as recited in claim 2, wherein the first current wireless network usage mode includes one of the following network usage modes:
   a mode in which the mobile station is not connected to the network;
   a mode in which the mobile station is connected to the network with sporadic, intermittent network activity;
   a mode in which the mobile station is connected to the network with network activity characteristic of email transmission and reception;
   a mode in which the mobile station is connected to the network with network activity characteristic of instant messaging;
   a mode in which the mobile station is connected to the network with network activity characteristic of browsing;
   a mode in which the mobile station is connected to the network with network activity characteristic of media streaming; and
   a mode in which the mobile station is connected to the network with network activity characteristic of telephone communications.

4. The method as recited in claim 2, wherein determining the second current wireless network usage mode according to the second consideration comprises monitoring which applications are active in the mobile station and/or monitoring, at the application level, activities of a user of the mobile station.

5. The method as recited in claim 4, wherein the second current wireless network usage mode includes one of the following network usage modes:
   a mode in which the mobile station is not connected to the network;
   a mode in which the only network activity of the mobile station is that which is required to maintain a connection to the network;
   a mode in which the mobile station is connected to the network and one or more applications that do not require a network connection are active;
   a mode in which the mobile station is connected to the network and there is user interface activity at the mobile station that does not require network resources;
   a mode in which the mobile station is connected to the network and an email application of the mobile station is active;
   a mode in which the mobile station is connected to the network and email is being sent by or received at the mobile station via the network;
   a mode in which the mobile station is connected to the network and an instant messaging application of the mobile station is active;
   a mode in which the mobile station is connected to the network and a network browsing application of the mobile station is active;
   a mode in which the mobile station is connected to the network and a media streaming application of the mobile station is active;
   a mode in which the mobile station is connected to the network and a media streaming session is in progress using a media streaming application of the mobile station; and
   a mode in which the mobile station is connected to the network and a telephone application of the mobile station is active and a call is established via the network.

6. The method as recited in claim 1, wherein determining the first current wireless network usage mode according to the first consideration comprises monitoring which applications are active in the mobile station and determining the second current wireless network usage mode according to the second consideration comprises monitoring activities at the application level of a user of the mobile station.

7. The method as recited in claim 6, wherein the first current wireless network usage mode and the second current wireless network usage mode include two of the following network usage modes:
   a mode in which the mobile station is not connected to the network;
   a mode in which the only network activity of the mobile station is that which is required to maintain a connection to the network;
   a mode in which the mobile station is connected to the network and one or more applications that do not require a network connection are active;
   a mode in which the mobile station is connected to the network and there is user interface activity at the mobile station that does not require network resources;

a mode in which the mobile station is connected to the network and an email application of the mobile station is active;

a mode in which the mobile station is connected to the network and email is being sent by or received at the mobile station via the network;

a mode in which the mobile station is connected to the network and an instant messaging application of the mobile station is active;

a mode in which the mobile station is connected to the network and a network browsing application of the mobile station is active;

a mode in which the mobile station is connected to the network and a media streaming application of the mobile station is active;

a mode in which the mobile station is connected to the network and a media streaming session is in progress using a media streaming application of the mobile station; and a mode in which the mobile station is connected to the network and a telephone application of the mobile station is active and a call is established via the network.

8. A mobile station comprising:

an antenna;

a radio coupled to the antenna through which the mobile station is able to communicate over a wireless local area network;

a wireless local area network controller coupled to the radio, which is able to control a background scanning process while the mobile station is associated to the network, the background scanning process occurring periodically according to an adjustable background scanning interval; and a processor coupled to the wireless local area network controller, the processor operative at a point in time:

to determine according to a first consideration a first current wireless network usage mode for the mobile station, the first current wireless network usage mode corresponding to a first background scanning interval for the mobile station;

to determine according to a second consideration a second current wireless network usage mode for the mobile station, the second current wireless network usage mode corresponding to a second background scanning interval for the mobile station that differs from the first background scanning interval;

to select whichever of the first background scanning interval and the second background scanning interval is shorter; and to ensure that following the point in time, any background scanning to check for neighboring access points is performed periodically at the selected background scanning interval until a different background scanning interval has been determined and selected.

9. The mobile station as recited in claim 8, wherein the processor is operative to determine the first current wireless network usage mode according to the first consideration by monitoring the mobile station's network traffic.

10. The mobile station as recited in claim 9, wherein the first current wireless network usage mode includes one of the following network usage modes:

a mode in which the mobile station is not connected to the network;

a mode in which the mobile station is connected to the network with sporadic, intermittent network activity;

a mode in which the mobile station is connected to the network with network activity characteristic of email transmission and reception;

a mode in which the mobile station is connected to the network with network activity characteristic of instant messaging;

a mode in which the mobile station is connected to the network with network activity characteristic of browsing;

a mode in which the mobile station is connected to the network with network activity characteristic of media streaming; and a mode in which the mobile station is connected to the network with network activity characteristic of telephone communications.

11. The mobile station as recited in claim 9, wherein the processor is operative to determine the second current wireless network usage mode according to the second consideration by monitoring which applications are active in the mobile station and/or by monitoring, at the application level, activities of a user of the mobile station.

12. The mobile station as recited in claim 11, wherein the second current wireless network usage mode includes one of the following network usage modes:

a mode in which the mobile station is not connected to the network;

a mode in which the only network activity of the mobile station is that which is required to maintain a connection to the network;

a mode in which the mobile station is connected to the network and one or more applications that do not require a network connection are active;

a mode in which the mobile station is connected to the network and there is user interface activity at the mobile station that does not require network resources;

a mode in which the mobile station is connected to the network and an email application of the mobile station is active;

a mode in which the mobile station is connected to the network and email is being sent by or received at the mobile station via the network;

a mode in which the mobile station is connected to the network and an instant messaging application of the mobile station is active;

a mode in which the mobile station is connected to the network and a network browsing application of the mobile station is active;

a mode in which the mobile station is connected to the network and a media streaming application of the mobile station is active;

a mode in which the mobile station is connected to the network and a media streaming session is in progress using a media streaming application of the mobile station; and a mode in which the mobile station is connected to the network and a telephone application of the mobile station is active and a call is established via the network.

13. The mobile station as recited in claim 8, wherein the processor is operative to determine the first current wireless network usage mode according to the first consideration by monitoring which applications are active in the mobile station and is operative to determine the second current wireless network usage mode according to the second consideration by monitoring activities at the application level of a user of the mobile station.

14. The mobile station as recited in claim 13, wherein the first current wireless network usage mode and the second current wireless network usage mode include two of the following network usage modes:
- a mode in which the mobile station is not connected to the network;
- a mode in which the only network activity of the mobile station is that which is required to maintain a connection to the network;
- a mode in which the mobile station is connected to the network and one or more applications that do not require a network connection are active;
- a mode in which the mobile station is connected to the network and there is user interface activity at the mobile station that does not require network resources;
- a mode in which the mobile station is connected to the network and an email application of the mobile station is active;
- a mode in which the mobile station is connected to the network and email is being sent by or received at the mobile station via the network;
- a mode in which the mobile station is connected to the network and an instant messaging application of the mobile station is active;
- a mode in which the mobile station is connected to the network and a network browsing application of the mobile station is active;
- a mode in which the mobile station is connected to the network and a media streaming application of the mobile station is active;
- a mode in which the mobile station is connected to the network and a media streaming session is in progress using a media streaming application of the mobile station; and
- a mode in which the mobile station is connected to the network and a telephone application of the mobile station is active and a call is established via the network.

15. A non-transitory computer-readable medium having computer-executable instructions thereon which, when executed by a processor of a mobile station, result in, at a point in time:
- determining according to a first consideration a first current wireless network usage mode for the mobile station, the first current wireless network usage mode corresponding to a first background scanning interval for the mobile station;
- determining according to a second consideration a second current wireless network usage mode for the mobile station, the second current wireless network usage mode corresponding to a second background scanning interval for the mobile station that differs from the first background scanning interval;
- selecting whichever of the first background scanning interval and the second background scanning interval is shorter; and
- ensuring that following the point in time, any background scanning to check for neighboring access points is performed periodically at the selected background scanning interval until a different background scanning interval has been determined and selected.

16. The non-transitory computer-readable medium as recited in claim 15, wherein determining the first current wireless network usage mode according to the first consideration comprises monitoring the mobile station's network traffic.

17. The non-transitory computer-readable medium as recited in claim 16, wherein the first current wireless network usage mode includes one of the following network usage modes:
- a mode in which the mobile station is not connected to the network;
- a mode in which the mobile station is connected to the network with sporadic, intermittent network activity;
- a mode in which the mobile station is connected to the network with network activity characteristic of email transmission and reception;
- a mode in which the mobile station is connected to the network with network activity characteristic of instant messaging;
- a mode in which the mobile station is connected to the network with network activity characteristic of browsing;
- a mode in which the mobile station is connected to the network with network activity characteristic of media streaming; and
- a mode in which the mobile station is connected to the network with network activity characteristic of telephone communications.

18. The non-transitory computer-readable medium as recited in claim 16, wherein determining the second current wireless network usage mode according to the second consideration comprises monitoring which applications are active in the mobile station and/or monitoring, at the application level, activities of a user of the mobile station.

19. The non-transitory computer-readable medium as recited in claim 18, wherein the second current wireless network usage mode includes one of the following network usage modes:
- a mode in which the mobile station is not connected to the network;
- a mode in which the only network activity of the mobile station is that which is required to maintain a connection to the network;
- a mode in which the mobile station is connected to the network and one or more applications that do not require a network connection are active;
- a mode in which the mobile station is connected to the network and there is user interface activity at the mobile station that does not require network resources;
- a mode in which the mobile station is connected to the network and an email application of the mobile station is active;
- a mode in which the mobile station is connected to the network and email is being sent by or received at the mobile station via the network;
- a mode in which the mobile station is connected to the network and an instant messaging application of the mobile station is active;
- a mode in which the mobile station is connected to the network and a network browsing application of the mobile station is active;
- a mode in which the mobile station is connected to the network and a media streaming application of the mobile station is active;
- a mode in which the mobile station is connected to the network and a media streaming session is in progress using a media streaming application of the mobile station; and
- a mode in which the mobile station is connected to the network and a telephone application of the mobile station is active and a call is established via the network.

20. The non-transitory computer-readable medium as recited in claim 15, wherein determining the first current wireless network usage mode according to the first consideration comprises monitoring which applications are active in the mobile station and determining the second current wireless network usage mode according to the second consideration comprises monitoring activities at the application level of a user of the mobile station.

21. The non-transitory computer-readable medium as recited in claim 20, wherein the first current wireless network usage mode and the second current wireless network usage mode include two of the following network usage modes:
- a mode in which the mobile station is not connected to the network;
- a mode in which the only network activity of the mobile station is that which is required to maintain a connection to the network;
- a mode in which the mobile station is connected to the network and one or more applications that do not require a network connection are active;
- a mode in which the mobile station is connected to the network and there is user interface activity at the mobile station that does not require network resources;
- a mode in which the mobile station is connected to the network and an email application of the mobile station is active;
- a mode in which the mobile station is connected to the network and email is being sent by or received at the mobile station via the network;
- a mode in which the mobile station is connected to the network and an instant messaging application of the mobile station is active;
- a mode in which the mobile station is connected to the network and a network browsing application of the mobile station is active;
- a mode in which the mobile station is connected to the network and a media streaming application of the mobile station is active;
- a mode in which the mobile station is connected to the network and a media streaming session is in progress using a media streaming application of the mobile station; and
- a mode in which the mobile station is connected to the network and a telephone application of the mobile station is active and a call is established via the network.

* * * * *